(12) United States Patent
Boston et al.

(10) Patent No.: US 11,407,369 B2
(45) Date of Patent: Aug. 9, 2022

(54) CUSTOMIZABLE AND DISTRIBUTABLE VEHICLE PERSONAS

(71) Applicant: FORD GLOBAL TECHNOLOGIES, LLC, Dearborn, MI (US)

(72) Inventors: Daniel Lewis Boston, Dearborn, MI (US); Ali Soloukmofrad, Dearborn, MI (US); Nayaz Khalid Ahmed, Canton, MI (US); Phillip Morris, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 695 days.

(21) Appl. No.: 16/401,818

(22) Filed: May 2, 2019

(65) Prior Publication Data

US 2020/0346598 A1 Nov. 5, 2020

(51) Int. Cl.
*B60R 16/023* (2006.01)
*G06F 8/65* (2018.01)
*G06F 16/9538* (2019.01)
*G06Q 30/06* (2012.01)

(52) U.S. Cl.
CPC ........... *B60R 16/0231* (2013.01); *G06F 8/65* (2013.01); *G06F 16/9538* (2019.01); *G06Q 30/0621* (2013.01)

(58) Field of Classification Search
CPC ... B60R 16/0231; G06F 16/9538; G06F 8/65; G06Q 30/0621
USPC ........................................................ 701/36
See application file for complete search history.

(56) References Cited

U.S. PATENT DOCUMENTS

| | | | |
|---|---|---|---|
| 7,379,541 B2 | 5/2008 | Iggulden et al. | |
| 8,258,704 B2 | 9/2012 | Brant | |
| 9,171,268 B1 | 10/2015 | Penilla et al. | |
| 10,207,757 B2 * | 2/2019 | Scaringe | G06Q 30/0645 |
| 2016/0318438 A1 | 11/2016 | Wadell | |

* cited by examiner

*Primary Examiner* — Gertrude Arthur Jeanglaude
(74) *Attorney, Agent, or Firm* — Michael Spenner; Brooks Kushman P.C.

(57) ABSTRACT

A server includes a memory storing a shared pool of user defined vehicle settings packages and may determine, from the shared pool, one or more settings packages meeting a search request. For each determined settings package, the server may determine compatibility of the determined settings package with configurable systems of a vehicle associated with the search request. The server may also present a selectable list of determined settings packages that are also determined to have a predefined minimum level of compatibility with the vehicle and download a selected settings package to the vehicle, responsive to selection of the selected settings package from the selectable list.

20 Claims, 4 Drawing Sheets

CUSTOMIZABLE AND DISTRIBUTABLE VEHICLE PERSONAS

TECHNICAL FIELD

The illustrative embodiments generally relate to methods and apparatuses for customization of and distribution of customizable vehicle personas.

BACKGROUND

Many consumers build a personal connection with their vehicle. They enjoy features such as approach lighting, and they become accustomed to the chirp patterns of their vehicle, as well as the voice for navigation and other instructions. This familiarity encourages the customer to buy a similar vehicle, as finding a vehicle in a parking lot, for example, based on a familiar chirp pattern, is rendered easier for a new vehicle if the chirp pattern is the same as a previously owned vehicle.

As customers engage with a variety of transportation modes such as ride sharing or short term vehicle subscriptions, they may lose the personal attachment with their vehicle and see it more as an appliance or means to an end. This may result in a loss of brand identification and personalized connection to a vehicle or original equipment manufacturer (OEM).

SUMMARY

In a first illustrative embodiment, a system includes a memory storing a shared pool of user defined vehicle settings packages and a processor. The processor is configured to determine, from the shared pool, one or more settings packages meeting a search request. For each determined settings package, the processor is further configured to determine compatibility of the determined settings package with configurable systems of a vehicle associated with the search request. The processor is additionally configured to present a selectable list of determined settings packages that are also determined to have a predefined minimum level of compatibility with the vehicle and download a selected settings package to the vehicle, responsive to selection of the selected settings package from the selectable list.

In a second illustrative embodiment, a system includes a processor configured to receive a settings package, defining a plurality of vehicle state settings, for provision to a settings package pool accessible by a plurality of users. The processor is also configured to compare state settings of the settings package to predefined manufacturer constraints, to determine whether settings are outside the manufacturer constraints and add the settings package to the package pool for access by the plurality of users, responsive to the state settings not being outside manufacturer constraints.

In a third illustrative embodiment, a method includes receiving a request for download of a predefined vehicle state setting package, including a vehicle identifier for a vehicle to which the package is to be installed. The method further includes determining which state settings of the state setting package do not apply to a current vehicle system of the vehicle, but which can be converted to apply to a different vehicle system of the vehicle. The method also includes converting the state settings that can be converted to apply to the different vehicle systems and downloading the setting package to the vehicle, including any converted state settings replacing the state settings determined not to apply to the current vehicle systems.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

The illustrative embodiments relate to customizable and shareable vehicle aspects that combined are referred to as vehicle personas. These personas could be part of an open or closed marketplace in which people can download, edit, or purchase specific personas for their vehicle. A persona could, for example, encompass a set of changes or factors which give the vehicle a specific character.

These factors could be somewhat superficial, such as the lighting pattern as you approach the vehicle, the chimes and chirps produced when performing actions or the navigation voice language style and accent. Additionally, there could be substantive attribute changes where possible for the vehicle, such as changes in shift pattern, pedal response, or suspension damping. These would give the vehicle a specific persona which the customer would be able to readily identify with.

Personas could be made up of a set of standardized features, standardized for that persona, in which the parameters are stored in a cloud-based server. Signal inputs for customized feature settings could be stored and translated between vehicle models to create the same or a similar desired setting between vehicles. For example, a standardized fore aft seat setting can be an offset distance from a pedal and the position of one seat could be translated based on distance-from-pedal to a desired setting for each other vehicle which is compatible with vehicle personas in general or this vehicle persona.

Personas could be editable or crowdsourced in a marketplace. It is already possible to make changes, when permitted, to vehicle modules through flashing the module, a $3^{rd}$ party market for personas could expand the availability of those changes in a safe and controlled marketplace. Personas could be approved internally at an OEM for drivability or verified for safety. Personas could be sold or monetized on this market, as a whole package unlocking all aspects, or, for example, through the ability to unlock which features are customizable to the customer.

Customizing voices for features may be difficult and requires large investment if an OEM is to customize a large number of voices. If this ability was open sourced through vehicle personas, however, anyone could contribute to add desirable voice features to their vehicle, for example the voice of a celebrity for navigation purposes and share these additions with the cloud.

Personas could also follow the driver between transportation modes. If the customer has unlocked a vehicle persona, that persona could transfer between physical vehicles, such as when the person is in a rental or autonomous vehicle (AV). This would add a familiar aspect to the user experience, as the vehicle appears and/or drives in a known and preferred state. Personas could capture information about their driver as well, such as where they like to go, eat, or listen to. This would allow a familiar voice to offer recommendations to them, even when they're not in their primary vehicle. Vehicle personas could be transferred automatically to a customer's new vehicle during the sales process. They could be uploaded to a centralized database and even allow for transfer between automakers if the vehicle is standardized to operate with vehicle personas. Vehicle personas could be made available to rental car companies, creating an environment where rental companies or AVs may even pay for the ability to attract customers to their transportation method by allowing the customer's desired persona to be available.

Figure 1:
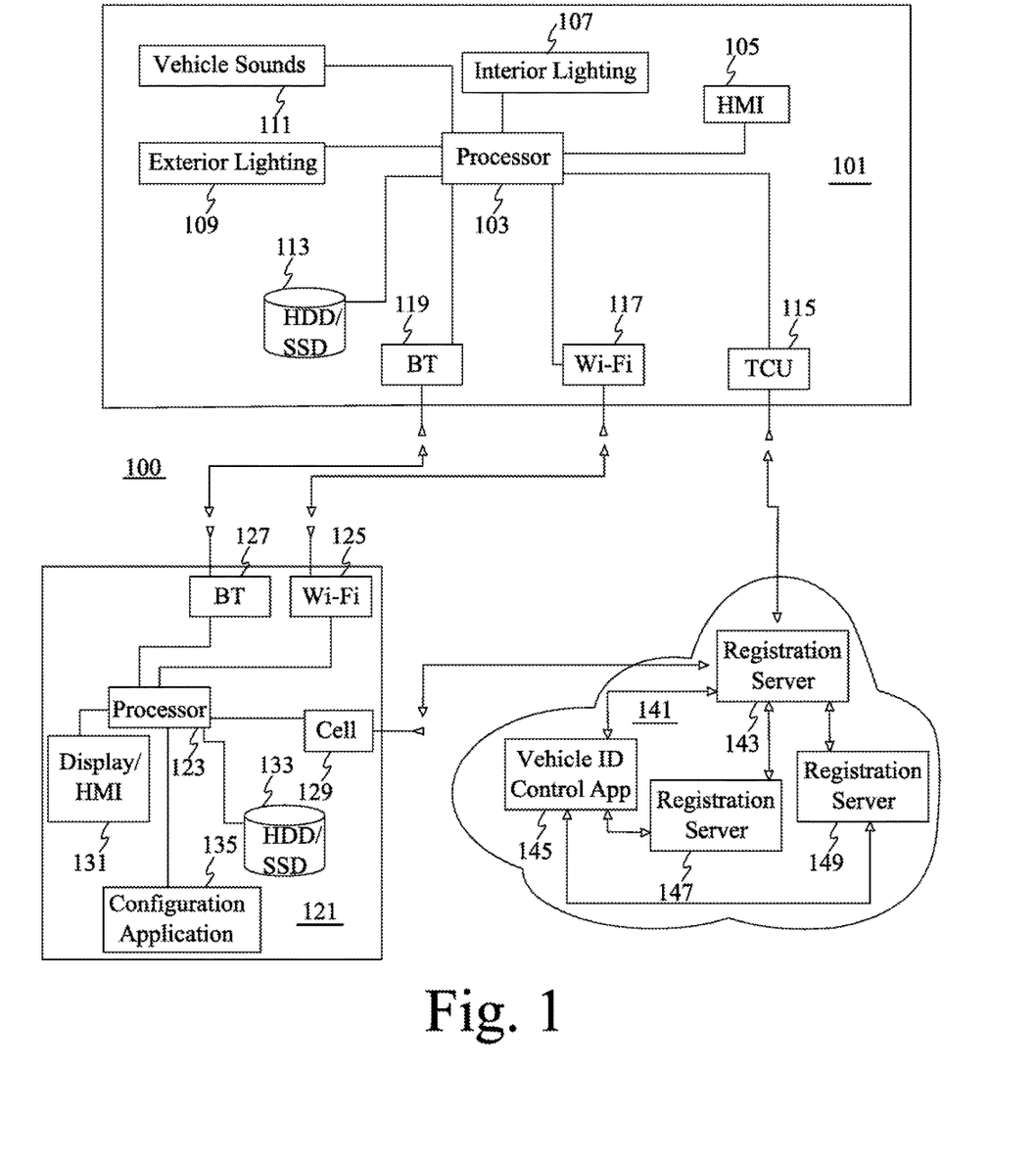
FIG. 1 shows an illustrative example of a system for persona implementation and distribution.

FIG. 1 shows an illustrative example of a system for persona implementation and distribution. In this illustrative example, a vehicle 101 includes a variety of user-configurable components controllable and/or configurable through processor 103 or similar computing controllers. The vehicle 101 often includes a display called a human machine interface (HMI) 105, and the vehicle 101 may include multiple of such displays to facilitate different onboard functions. For example, the vehicle 101 may include a central HMI 105 in a center-stack, and may include an informational HMI in an instrument cluster. Either or both may be user interactable and user configurable, and may be capable of having special colors, imagery, sounds, etc. appointed thereto and associated therewith.

Also, in this example, the vehicle 101 includes configurable interior lighting 107. Features such as lighting 107 can be preset to different strengths corresponding to times of day, ambient light levels, etc. Also, in many vehicles 101, users can change the lighting to match a theme 107 or custom set of features. For example, the user may have one set of lighting 107 for a "night out" theme and another set of lighting 107 for a "driving home from work" theme.

In a similar manner, vehicle 101 exterior lighting 109 may be customizable for brightness, colors, when automatically engaged, etc. Users can install custom lighting 109 controllable through the vehicle processor 103 or other controller, or the vehicle 101 may come with certain exterior lighting 109 settings already controllable through the vehicle 101 processor 103.

Vehicle 101 systems often have a variety of sounds 111 associated therewith as well. From an unlock chirp, to a seatbelt warning to a phone call notification, a vast array of sounds can be associated with vehicle 101 functions. Users can download specific sounds 111 to match a theme, and possibly even record certain sounds 111 using a vehicle 101 mic. When a user is present in the vehicle 101 and a given theme is chosen, the sounds 111 and interior 107 and exterior 109 lighting may all change to match the given theme or persona.

All of the supporting data for the lighting 107, 109 and/or sound 111 changes can be stored in a hard disk drive or solid-state drive 113, which is one form of vehicle 101 memory. The drive 113 can store sound 111 files downloaded from a user device 121 or the cloud 141. Most vehicles 101 that include some light emitting diodes (LEDs) provide for color customization of those lights 107, 109, but additional customization options and aftermarket light control options may be stored on the SSD 113 as well. The drive may further store a copy of regularly accessed personas, along with all the configuration settings associated with each.

The processor 103 may further be connected to a telematics control unit (TCU) 115 that provides remote communication via a cellular modem with the cloud 141. A vehicle 101 user may upload and download both personas and data to support personas via the TCU 115 to cloud 141 connection.

In this example, the cloud 141 includes an original equipment manufacturer (OEM) server 143, that is capable of managing personas for individual user accounts, capable of vetting personas for validation purposes, and capable of distributing personas or persona download information when working in conjunction with a digital market for personas.

Also, in this example, there is a remote persona marketplace 145 accessible by the vehicle 101 computer through the TCU 115. This is a place where users can post and sell or share configuration settings and personas, for purchase or download by other users. The marketplace 145 can include searchable whole or partial system configurations (e.g., a whole theme or simply a lighting theme). In this example, there are also servers 147 that sell and store custom lighting configurations 147 and servers that store and sell custom sound 149 configurations. While vehicle 101 lighting 107, 109 can typically be configured in accordance with a designation associated with a persona, sounds 111 may require custom downloaded audio content, which could be packaged as part of a persona or referenced by the persona but downloaded at the expense of a persona-downloading user. Custom sound 149 or lighting 147 servers may also offer partial alternatives for a user who likes most aspects of a downloaded persona, but just wants to change one or two features.

In addition to a cloud connection for obtaining and sharing persona and persona-supporting data, the vehicle 101 may use an onboard Wi-Fi 117 or BLUETOOTH 119 transceiver to communicate with a mobile device 121. The mobile device 121 includes a processor 123 and Wi-Fi 125 and BLUETOOTH 127 transceivers capable of communication with a vehicle 101 computer. The device may also include a cellular 129 transceiver capable of communication with the cloud 141 and any servers thereon. Even an OEM server 143 may be in communication with a mobile device 121, if the mobile device 121 is downloading, uploading or searching for a new persona to add to a vehicle 101 collection of personas.

The mobile device 121 includes an HMI 131 that supports persona configuration on the mobile device, which can include selection of lighting themes or audio clips, as well as browsing an online marketplace 145 for personas that are compatible with owned or rented vehicles 101. Selected personas can be downloaded to an SSD 133 or memory card provided to the mobile device 121. The SSD 133 may also store audio files and persona configuration files for allowing offboard (when the user is away from the vehicle 101) tinkering with persona setups. Selected audio and image files stored on the SSD 133 can then be downloaded to the vehicle 101 when a wireless connection or wired connection is established between the mobile device 121 and the vehicle 101.

Data supporting personas (settings, files, etc.) can also be stored by the OEM server 143 and can be distributed to vehicles 101 on an as-needed basis. For example, if a user rents a vehicle 101 that has configurable systems that can be configured in accordance with some or all of a user persona stored in the cloud 141, the OEM server 143 can distribute the data supporting the accessible (based on the vehicle 101 systems) portions of the persona. The vehicle 101 that is rented can then execute those configuration settings for the duration of a rental period, and thus the user's personas can be included as part of a traveling experience.

In addition, some users may create many personas for the purposes of selling personas in a digital marketplace 145. This can take the burden off of the OEM to provide infinite customized options, and allow users of similar tastes to share configuration settings via the exchange or market 145. This can include lighting, sound and even performance settings, and an OEM server 143 can vet uploaded profiles for compatibility and acceptability before allowing the profiles to be shared or downloaded.

Figure 2:
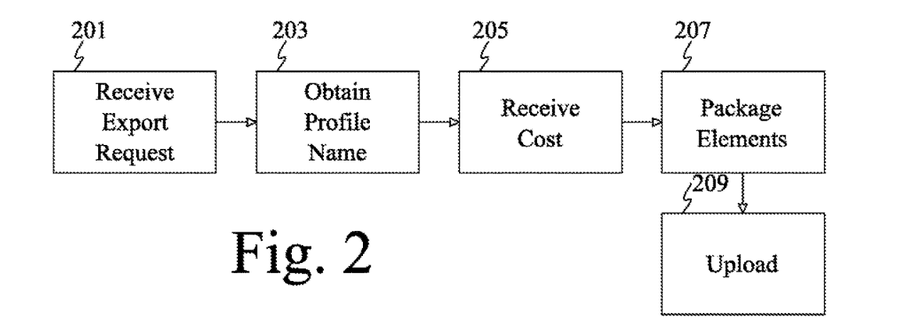
FIG. 2 shows an illustrative process for profile export.

FIG. 2 shows an illustrative process for profile export executable by, for example, a vehicle 101 processor 103. In this example, a user configures a set of vehicle 101 system profile/persona settings via an onboard HMI 105 or mobile device 121.

Once the user is satisfied with the profile, the user may attempt to export the profile at 201. The vehicle 101 receives the request at 201 and obtains a profile name at 203. This may include a theme name, a user name or other identifying characteristic that identifies the profile and that may be searched on the digital marketplace 145 or exchange. The user can further define a price for use of the persona at 205, which may include configuration of whether the persona can be demoted by a user and/or whether the persona will include sound elements or whether those will have to be separately downloaded.

The vehicle 101 then packages the elements comprising the persona at 207, which includes both settings and supporting files (if included). This package can include vehicle 101 configuration settings (seat settings, pedal resistances, lighting, sounds, etc.) as well as data stored in the vehicle 101 SSD 113, such as custom sound segments or images that are not publicly available. Once the vehicle 101 has packaged the requisite elements at 207, the vehicle 101 uploads the persona and data to the cloud at 209.

Figure 3:
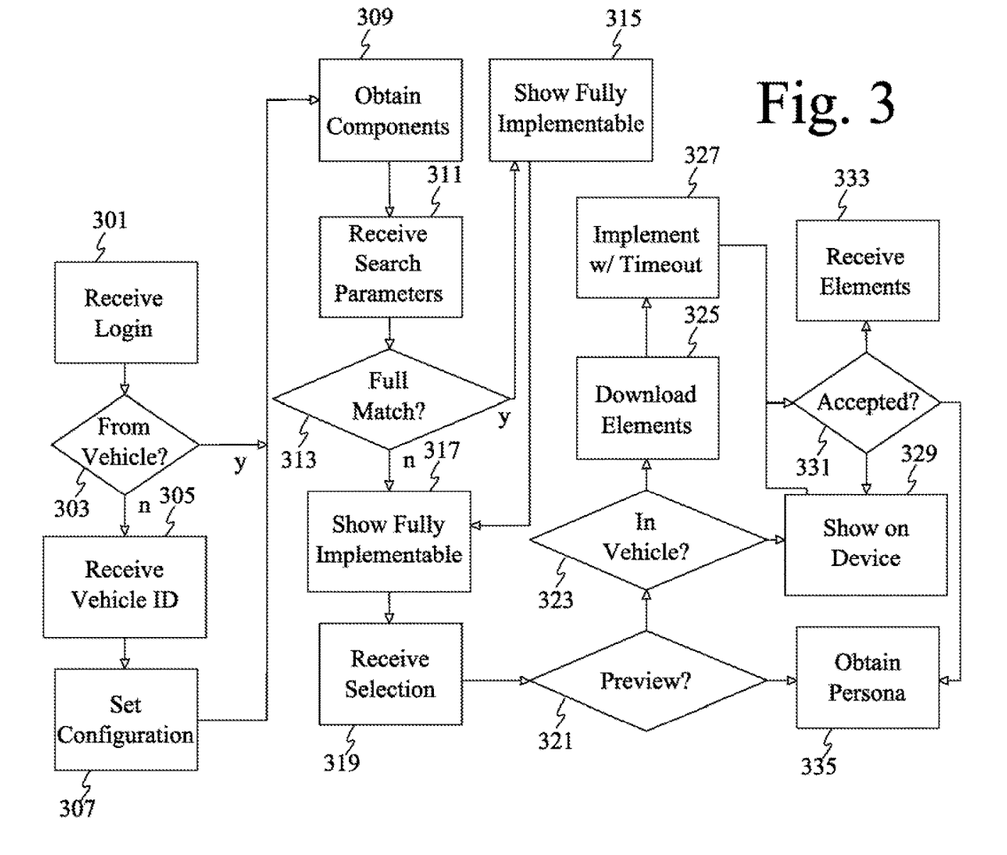
FIG. 3 shows an illustrative process for persona searching.

FIG. 3 shows an illustrative process for persona searching, executable by, for example, a vehicle 101 processor 103 or a mobile device 121 processor 123 in conjunction with a cloud server 143. If persona configuration and selection is available via a mobile device 121, then the process shown in FIG. 3 can be executed by either a mobile device 121 processor 123 or a vehicle 101 processor 103 working with the cloud server 143. Even though the vehicle 101 is being configured, it may be simpler for a user to search and compare personas when outside the vehicle 101, and thus mobile device 121 control over persona configuration may be provided.

The server 143 receives a login at 301, where the user identifies themselves and provides credential information. This login could also simply identify a vehicle 101 as opposed to a user. If the login was not from a vehicle 101 HMI 105 at 303, the server requests and receives a vehicle identification from a mobile device 121. This vehicle ID can identify a specific vehicle 101 with a specific configuration usable by the server 143 for compatibility verification. While it may be possible for a user to preview any number of personas on a mobile device 121 display 131, the user may only be permitted to download personas having a certain level of compatibility with a particular vehicle 101, to avoid both complaints to an OEM and potentially damaging technical conflicts.

Based on a vehicle ID, the server 143 determines the vehicle 101 configuration at 307 and obtains a list of vehicle 101 components and systems at 309 that qualify as configurable systems or which may be affected by one or more changes implemented by a downloaded persona. This could include a list of all vehicle systems, but it may also be more efficient to simply consider a list of systems for which configuration options, via personas, are provided.

The server 143 also receives search parameters at 309, defining a specific persona or type of persona for which to search. This can include, for example, searching for personas for a specific make or model of vehicle 101, searching for lighting only or sound only personas, searching for themed personas, searching by persona creator, searching based on a custom name, date or time, and any other reasonable parameters that might be associated with a database set of searchable personas.

Once the search returns one or more personas, the server 143 determines at 313 if the configuration settings of each returned persona are fully or partially implementable on the identified vehicle 101. For example, if the vehicle 101 lacks custom exterior lighting, the server 143 may determine partial compatibility. The user may specify whether or not only fully-matching personas should be shown, and thus even a partial match at 313 may be shown as a result at 315 based on user settings. Users downloading partial matches may have to agree that those personas will not be supported by any otherwise provided OEM support, and personas with too many un-implementable features may be prohibited for download on a given, largely-incompatible vehicle 101.

If the user only desires to see fully implementable personas at 313, the server 143 may restrict results to those fully implementable results at 317. These fully matched results at 317 can also be shown in conjunction with partially matched and partially implementable results from 315.

The server 143 then receives the user selection of one or more personas for download at 319 and determines at 321 if a given selected persona has a preview option. Preview options may allow the user to view altered images of a vehicle 101 on a mobile device 121 and/or actually experience the fully implemented persona in a vehicle 101 for a while before being forced to purchase the persona. If there is no preview option at 321, the server may send the persona to the mobile device 121 or vehicle 101 at 335.

If the preview option is enabled for a persona, the server 143 may determine at 323 whether the user is in a vehicle 101 or not (e.g., from where did the request originate). If the user is not in the vehicle 101, the server 143 may send images or instructions to a device 121 to display images of an altered vehicle 101 experience. This can include, for example, playing sample sound in response to simulated vehicle 101 events selected on the mobile device 121 and/or showing altered images of a vehicle 101 interior or exterior to reflect changes associated with the persona.

If the user is determined to be in the vehicle 101 at 323, the server 143 may enable download of the full set of persona elements at 325. This can include a fully implementable version of the persona that will simply be permanently stored (or not deleted) after a purchase of the persona is confirmed. In this example, the server 143 sets a timeout for the persona, and the user downloading the persona can use some or all of the persona for the designated time period. This allows users to test personas before purchasing them, which can be a useful feature because of the environmental modifications made by many of the personas.

If the user accepts the persona at 331, the server 143 can permit download of the persona at 355 or send instructions to prevent deletion of an already downloaded persona. If the user declines to purchase the persona at 331, the server 143 can send instructions to remove the elements of the persona from the vehicle 101 or mobile device 121 at 333.

Figure 4:
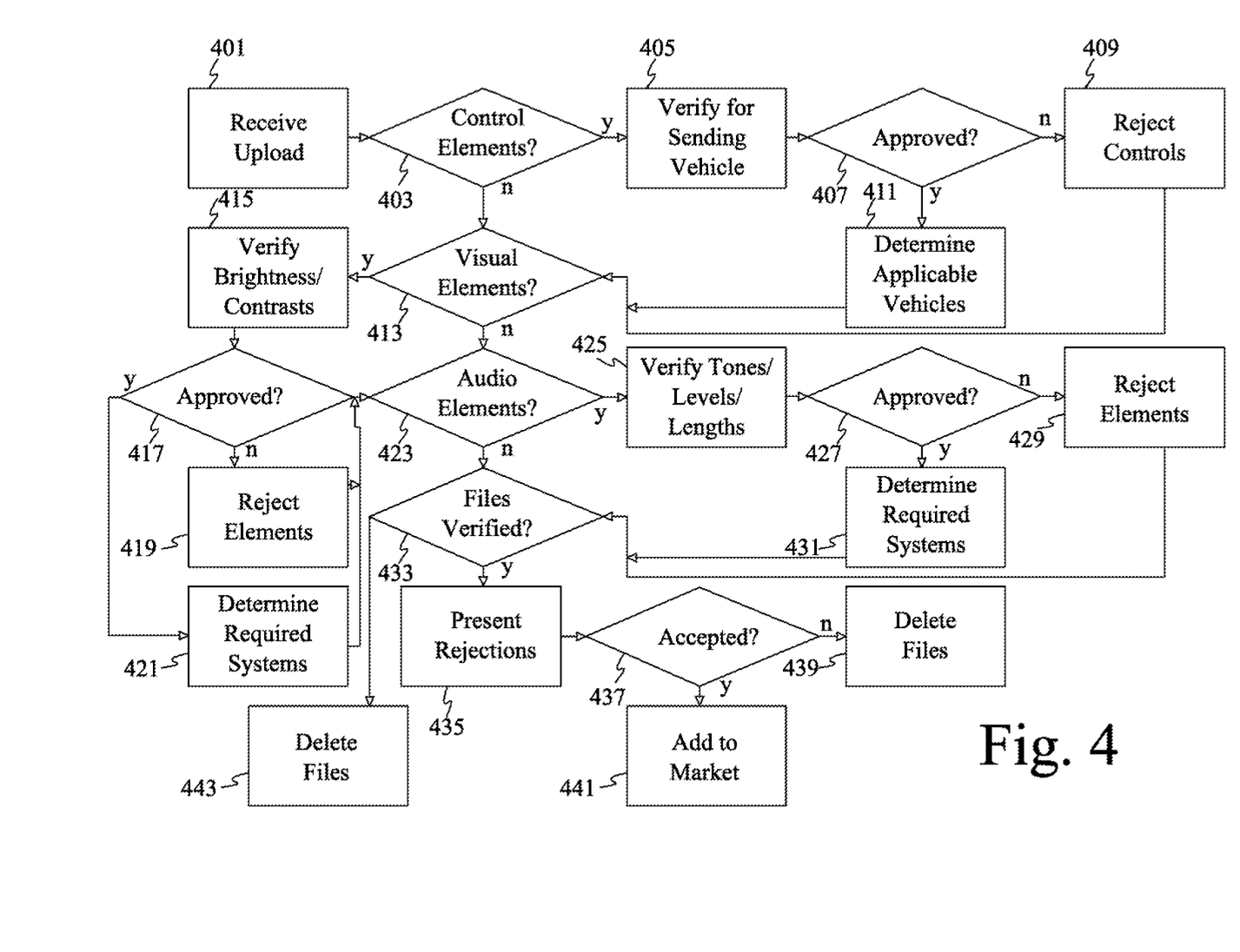
FIG. 4 shows an illustrative example of a persona upload and vetting process.

FIG. 4 shows an illustrative example of a persona upload and vetting process executable by, for example, an OEM server 143. In this illustrative example, a user has defined a persona onboard a vehicle 101 and is attempting to upload the persona for sharing or distribution. Because many vehicles 101 have different onboard systems and configuration settings may not be universal or even compatible with certain models, the OEM server will vet a persona in this example to determine if the persona has any prohibited settings or incompatible settings. A user may be given greater latitude when defining a personal persona than when sharing a persona, and the user may be required by the OEM to keep certain controls within constrained parameters for sharing purposes.

In this example, the server 143 determines if the uploaded persona received at 401 includes at control elements at 403. Control elements in this example means vehicle control settings, such as changing steering wheel positions, pedal resistance or other vehicle system settings. If the persona does include one or more control elements at 403, the server 143 can verify those settings for the uploading vehicle at 405. That is, the server can consider the make, model, and year of the vehicle 101 for which the persona was originally created and determine if other vehicles 101 sharing those fundamental characteristics are suitable for implementing the persona. Because there may be aftermarket modules installed in the original vehicle 101 and/or because option packages may vary across even the same make and model, the server 143 may also verify the persona for any known option packages and aftermarket parts, so that at least a subset of vehicles 101 that could be suitable for the persona could be identified.

If the server 143 approves of the persona at 407, the server 143 may then determine a broader set of vehicles at 411 to which the persona might apply. This can include a feature by feature determination or a determination of a select group of models and model years. It is also possible to perform this determination when the persona is requested, and the decision as to whether to do a broader determination up front or more specific determinations on an as-requested basis can be left to an implementer. If the persona is not even approved for the base vehicle 101 from which it was uploaded, the server 143 rejects the control element portions of the persona at 409. That is, the remainder of the persona may still be distributed, but the rejected control element configurations will not be available for sharing via distributed personas.

Next, at 413, the server 143 determines if the persona includes any visual elements and/or lighting elements. If so, the server 143 may vet those elements for a number of compatibility issues. The server can identify risqué background imaging, lighting that is too bright or too dim, or light colors that are incompatible with any OEM-install lighting 107, 109 sets. Again, even if the persona cannot be approved for a stock vehicle 101 configuration, the server 143 may also be capable of considering aftermarket parts and approving the persona for other vehicles 101 equipped with the same or compatible parts.

If the lighting and visual elements are approved at 417, the server 143 again may determine other vehicles 101 with which the persona is compatible at 421. This can be element by element (e.g., certain interior light 107 settings may be more widely compatible than accompanying exterior light 109 settings). Or, again, the vetting of the elements on a vehicle-by-vehicle basis may be done as the persona is requested. In this example, the initial vetting is done before the persona is approved for upload, but even that vetting could be done after a download had been requested. If the persona does not even pass the initial vetting approval at 417, then some or all of the visual elements (those not passing approval, at least) are rejected for inclusion at 419.

Next, the server 143 determines if the persona includes audio components at 423. The server 143 again performs a verification process at 425, which can include, for example, vetting for curse-words, checking volume levels associated with sounds, checking sound durations and verifying usability of sound files provided with the persona. If the sounds are initially approved at 427, the server 143 can then perform the verification process for individual vehicle 101 systems at 431. This can include, for example, identifying specific audio characteristics or components associated with a sound, as well as identifying which vehicle 101 systems are associated with which sounds, so that a vehicle 101 compatibility with a sound (or visual) setting may be defined more by the systems present therein than by a make or model. This same sort of verification can be performed for the visual and control settings, and the choice of how to verify the elements (e.g., via vehicle line or via requisite system) is within the scope of the invention. The server 143 also rejects and removes any corrupt or otherwise impermissible audio files at 429.

Once the server 143 confirms that some subset or all of the persona files are approved at 433, the server 143 may present an uploading user with all rejected elements at 435. This can allow the user an opportunity to retool the rejected elements and/or an opportunity to decline to post a persona with too many missing or rejected elements.

If the user agrees with any changes that the server 143 made to the persona at 437, the server 143 can add the persona to a database of marketed personas at 441, or otherwise make the persona searchable and downloadable. If the user declines to add the persona after the changes at 437, the server 143 can delete the uploaded files at 439.

Figure 5:
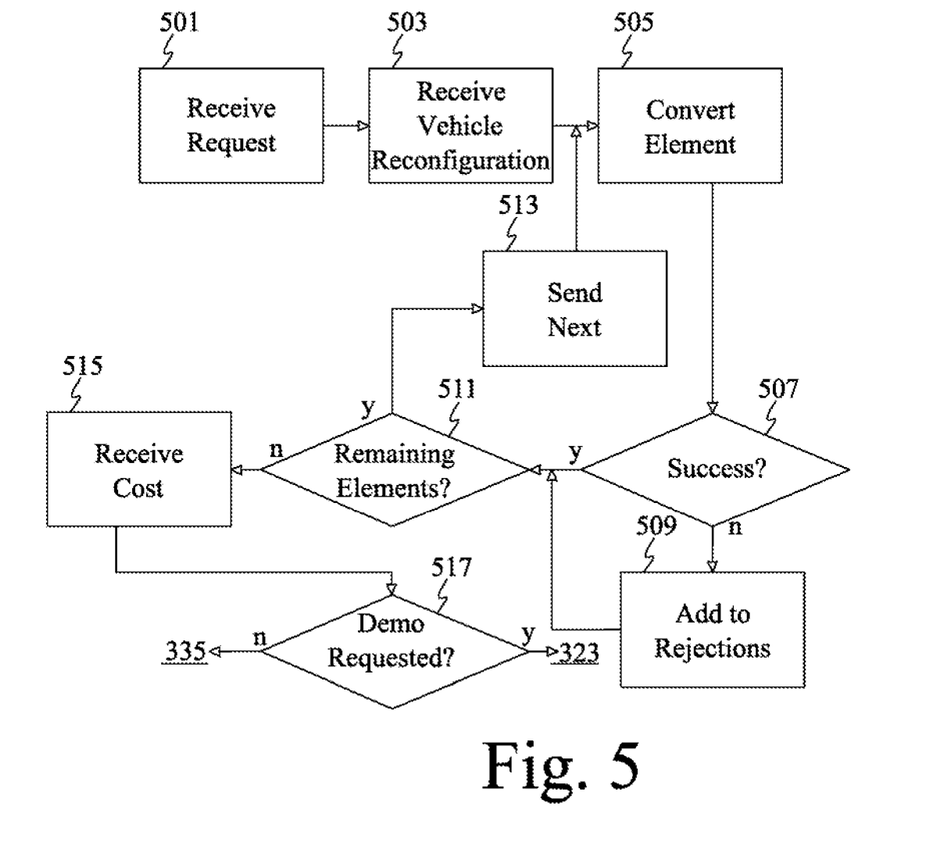
FIG. 5 shows an illustrative element conversion process.

FIG. 5 shows an illustrative element conversion process executable by a server 143 in response to a persona download request. This process can be executed in conjunction with the approval process or could replace portions of the approval process from FIG. 4. In this example, the server 143 receives a request at 501 for a particular persona.

Even if a persona has been fully approved by the approval process, it may contain elements that do not exactly comport with a requesting vehicle's 101 configuration. Pedal or seat settings may be inappropriate for the vehicle 101, lights or sounds may not match or be precisely compatible with existing vehicle lighting 107, 109 and sound 111 systems. Even in the absence of perfect compatibility, it is possible to modify settings so that the general look and feel of the persona is preserved. Pedal or seat positions may be accommodated and altered based on relative positions of the seat to wheel, seat location in the cabin, etc. Lighting may be modified to fit existing light patterns and locations, and sounds can be adapted to work with similar, but not exactly the same, elements, when the exact same elements are lacking.

Suitable compatibility may be determined based on, for example, full compatibility, partial compatibility of at least a percentage of settings (specified by an OEM or requestor, for example), or compatibility of at least a minimum certain set of features specified by an OEM, requestor or uploader. That is, for example, the requestor can set that certain aspects (e.g. lighting) must be compatible whereas other aspects (e.g. seat position) need not be compatible. Similarly, the OEM may require certain compatible settings in order to even attempt to apply a persona, and/or the uploader may even have a personal brand and may only want certain vehicles with minimum compatibility to install a given persona (e.g., a celebrity may want lighting and voice compatibility, but may not want a self-branded package installed in a system that could tarnish the personal brand).

The server 143 (although the vehicle 101 itself could also perform this process) receives the vehicle 101 configuration at 503. This could include a full set of systems or a specific set of systems corresponding to systems configurable by the persona requested at 501. For each configuration element that does not have an exact (or exactly configurable pursuant to the profile) system match, the server 143 can convert the element at 505 in accordance with predefined conversion parameters, designed to preserve as much of the converted element's look and feel as possible.

If the conversion was successful at 507, that is, if the server 143 could determine and set a suitable alternative to the otherwise incompatible instruction, the server 143 checks for remaining elements at 511. Otherwise, if the server 143 failed to convert the incompatible instruction at 507, the server 143 adds the feature to a list of rejected features at 509, for later presentation to a user. As long as elements remain at 511, the server 143 continues to convert the instructions for those elements that cannot be directly implemented based on a current vehicle 101 configuration.

Once all elements have been converted or rejected, the server 143 presents the rejected elements at 515. This can include, for example, sending a list of what could not be converted, what the persona-defined values for those elements were supposed to be, a sample screen shot of what the elements should look like, etc. This can be presented prior to persona purchase, as in this example, so that the user knows that an incomplete or partially incompatible persona is being purchased. The server 143 may also present modifications to elements where implemented, so the user understands what changes were made.

If the user then desires to demo the modified persona at 517, the server can execute the demonstration example process beginning at 323. Otherwise, the user may simply still elect to purchase the persona and the server can execute the purchase process at 335.

Programming instructions for executing illustrative embodiments and the like may be executed by suitable processors, including, but not limited to, vehicle processors, cloud processing and/or mobile device processors, depending on the variation of the examples. Non-transitory storage media, such as, but not limited to, hard disk drives, solid state drives and other storage media used to store programming instructions, may store instructions allowing processors accessing that storage media to execute the instructions to perform the illustrative embodiments and the like.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a memory storing a shared pool of user defined vehicle settings packages; and
a processor configured to:
determine, from the shared pool, one or more settings packages meeting a search request;
for each determined settings package, determine compatibility of the determined settings package with configurable systems of a vehicle associated with the search request;
present a selectable list of determined settings packages that are also determined to have a predefined minimum level of compatibility with the vehicle;
receive selection of a settings package from the selectable list; and
download the selected settings package to the vehicle, responsive to selection of the selected settings package from the selectable list.

2. The system of claim 1, wherein the vehicle associated with the search request is a vehicle from which the search request originated.

3. The system of claim 1, wherein the vehicle associated with the search request is a vehicle predefined as being owned by a user from whom the search request originated.

4. The system of claim 1, wherein an indication of the vehicle associated with the search request is included in the search request.

5. The system of claim 1, wherein the minimum level of compatibility includes full compatibility of all settings in a given settings package with configurable systems of the vehicle.

6. The system of claim 1, wherein the minimum level of compatibility includes compatibility of a predefined percentage of settings in a given settings package with configurable systems of the vehicle.

7. The system of claim 1, wherein the minimum level of compatibility includes compatibility of one or more pre-specified settings of a given setting package with configurable systems of the vehicle.

8. The system of claim 1, wherein the processor is further configured to offer a preview of one or more settings packages on the list.

9. The system of claim 8, wherein the processor is further configured to offer the preview for settings packages having a predefined preview permissibility associated therewith.

10. The system of claim 8, wherein the processor is further configured to set an expiration time for a settings package requested for preview.

11. The system of claim 10, wherein the expiration time is defined in a variable predefined for a given settings package.

12. The system of claim 1, wherein the processor is further configured to determine a compatible alternative setting for at least one setting determined not to be directly applicable to a vehicle system in a given package.

13. The system of claim 12, wherein the processor is further configured to treat the alternative settings as a compatible setting for purposes of the predefined minimum level of compatibility.

14. A system comprising:
 a memory storing a shared package pool of user defined vehicle settings packages; and
 a processor configured to
 receive a settings package, defining a plurality of vehicle state settings, for provision to the shared package pool accessible by a plurality of users;
 compare state settings of the settings package to predefined manufacturer constraints, to determine whether settings are outside the manufacturer constraints; and
 add the settings package to the shared package pool for access by the plurality of users, responsive to the state settings not being outside manufacturer constraints.

15. The system of claim 14, wherein the processor is configured to add the settings package to the shared package pool, absent any state settings that are outside manufacturer constraints, responsive to one or more state settings being outside manufacturer constraints.

16. The system of claim 14, wherein the state settings include audio playback sounds and wherein the manufacturer constraints limit usage of certain words.

17. The system of claim 14, wherein the state settings include light settings and wherein the manufacturer constraints limit brightness levels under prespecified conditions.

18. The system of claim 14, wherein the state settings include aftermarket part settings and wherein the manufacturer constraints limit setting of aftermarket parts.

19. A method comprising
 receiving a request for download of a predefined vehicle state setting package, the request including a vehicle identifier for a vehicle to which the package is to be installed;
 determining which state settings of the state setting package do not apply to a current vehicle system of the vehicle, but which can be converted to apply to a different vehicle system of the vehicle;
 converting the state settings that can be converted to apply to the different vehicle systems; and
 downloading the setting package to the vehicle, including any converted state settings replacing the state settings determined not to apply to the current vehicle systems.

20. The method of claim 19, further comprising removing state settings determined not to apply to a current vehicle system that further cannot be converted to apply to the different vehicle system, prior to downloading.

* * * * *